Dec. 25, 1962  V. W. GIDEON  3,069,936
MACHINE TOOL

Filed May 15, 1961  4 Sheets-Sheet 1

INVENTOR.
Victor W. Gideon,
BY Wolfe Hubbard,
Voit & Osann
Attorneys.

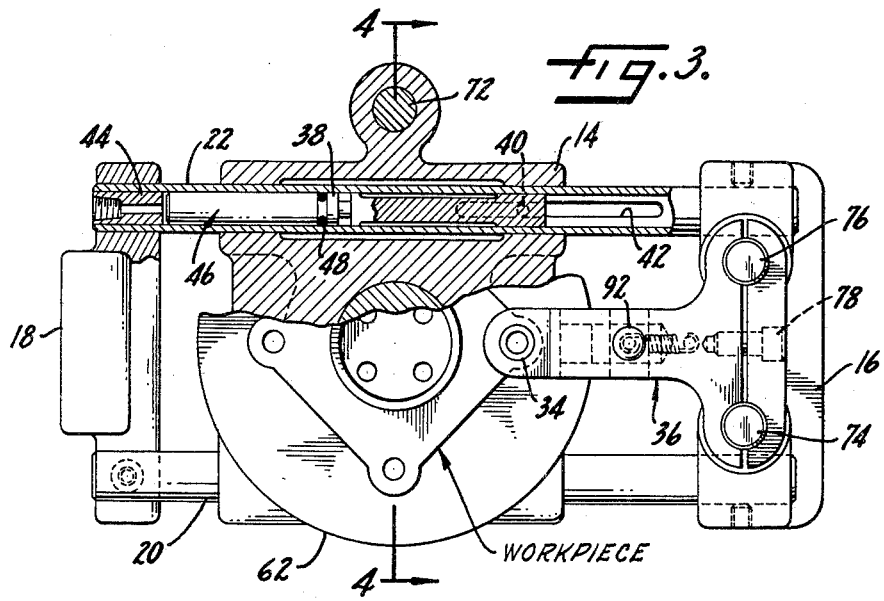
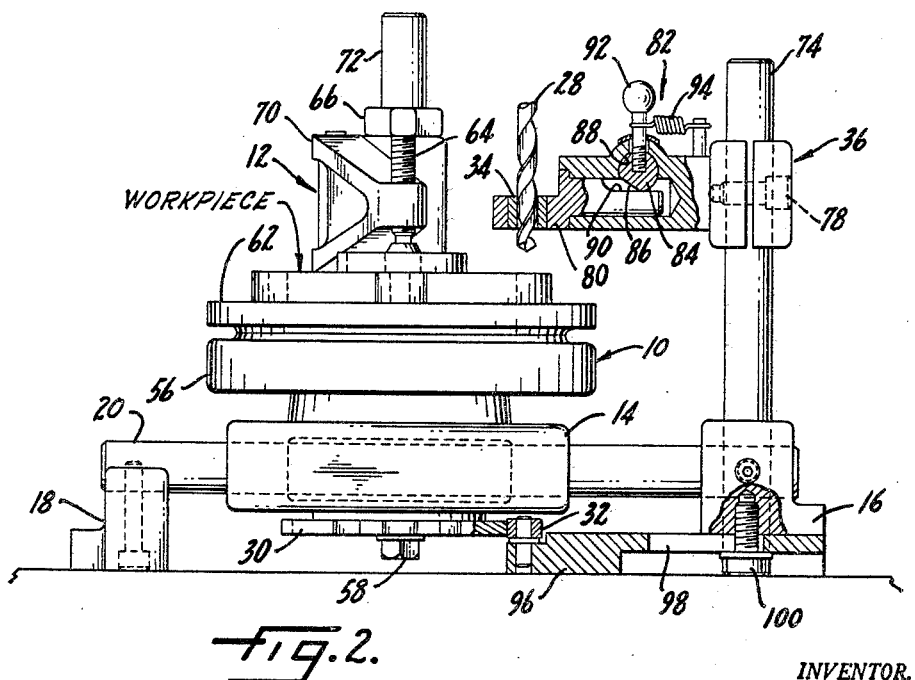

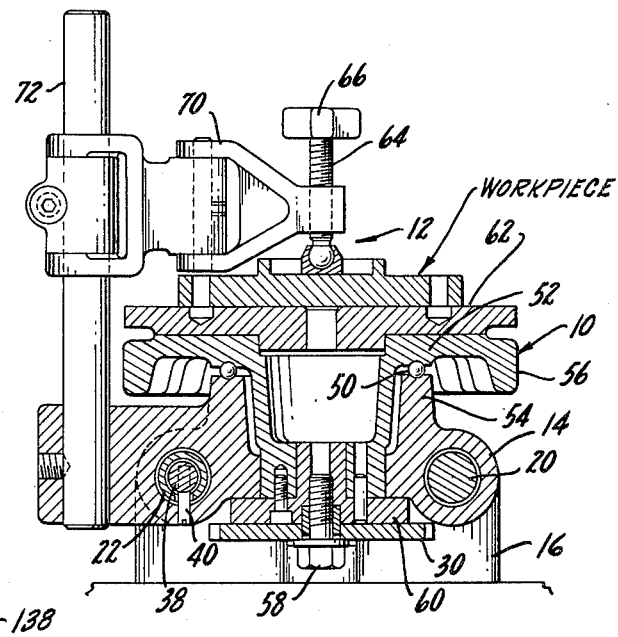
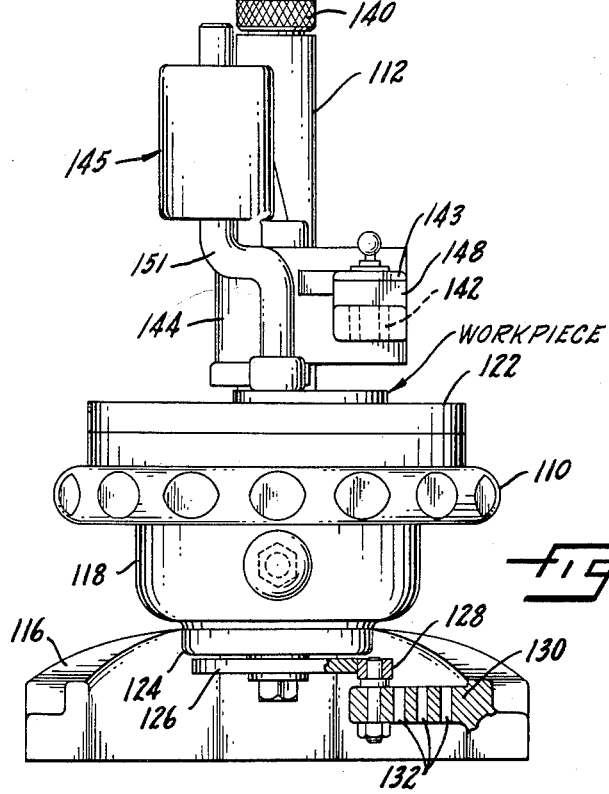

Dec. 25, 1962 V. W. GIDEON 3,069,936
MACHINE TOOL
Filed May 15, 1961 4 Sheets-Sheet 4
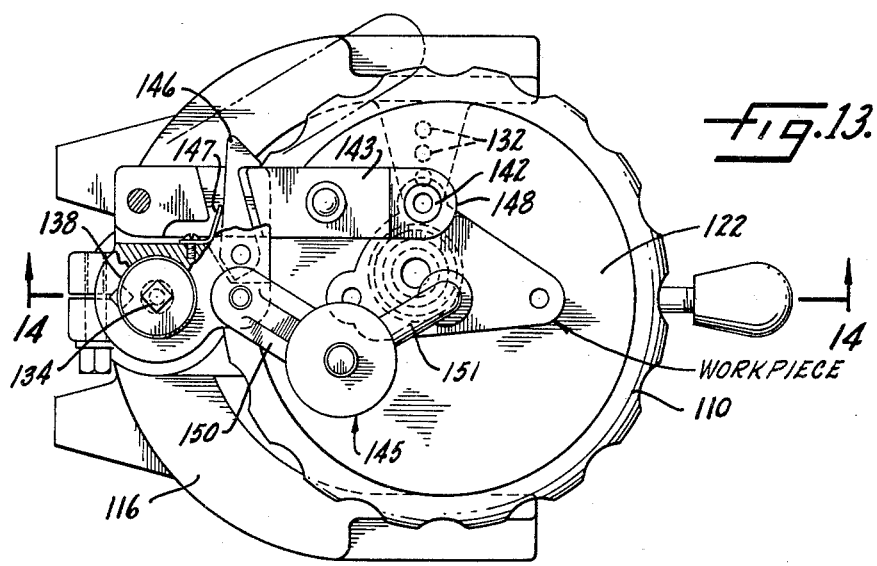
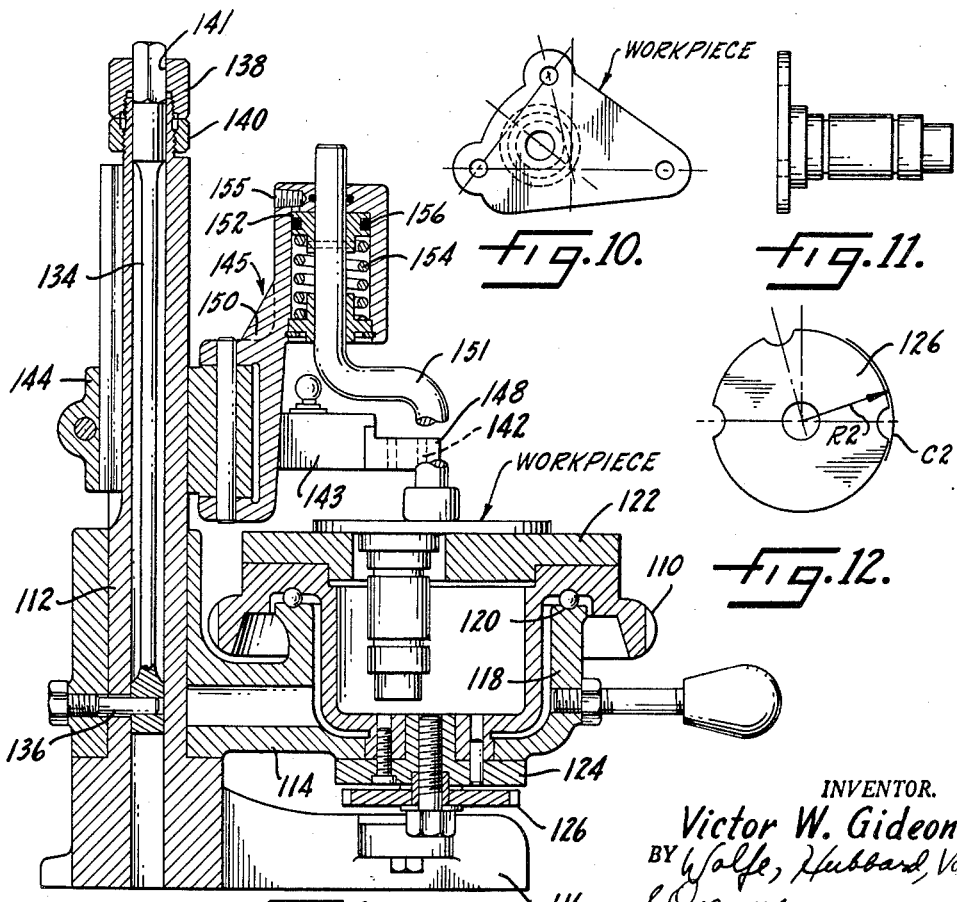
INVENTOR.
Victor W. Gideon,
BY Wolfe, Hubbard, Voit
& Osann Attorneys.

United States Patent Office 3,069,936
Patented Dec. 25, 1962

3,069,936
MACHINE TOOL
Victor W. Gideon, 6604 N. Sioux Ave., Chicago 46, Ill.
Filed May 15, 1961, Ser. No. 110,249
10 Claims. (Cl. 77—64)

The present invention relates to machine tools and more particularly to work-holding devices for use on drilling machines.

The main object of the present invention is to provide a work-holding device especially suited for use on machine tools such as drilling machines such device having pattern controlled positioning means whereby the work is moved about following a pattern with respect to a cutter on the spindle of the machine to locate the work for machining operations.

Another object is to provide a work-holding and positioning device which is particularly suited to use on drill presses and which by eliminating tedious and makeshift hole-locating procedures makes a drill press capable of limited quantity production manufacture of duplicate parts.

A further object is to provide a work-holding and positioning device for drilling and like machining operations which is capable of holding workpieces of a wide variety of shapes, sizes and conditions. Another object is to provide a work-holding and positioning device for light milling cuts as well as for drilling, boring and reaming. A further object is to provide such a device which is quickly and easily changed from one job to another.

A further object is to provide a low-cost work-holding and positioning device for drilling work which eliminates the need for new jigs and fixtures for each limited production job and thereby affords lower production costs.

A further object is to provide such a device in which it is impossible to insert the work in any but the correct way, and which provides suitable quick-acting clamping means for holding the work while it is drilled reducing the operation time and the cost of performing the machining operations. Still another object is to provide a work-holding device which affords adequate support so that the work is held rigidly and against springing while it is drilled to obtained greater precision in drill hole location.

Other objects and advantages will become apparent as the following description proceeds, taken in connection with the accompanying drawings, in which:

FIG. 2 is a fragmentary front view with parts in section illustrating the work-holding and positioning device shown on the table of the drill press depicted in FIG. 1;

FIG. 3 is a plan view with parts in section of the device shown in FIG. 2;

FIG. 4 is a vertical section of the device shown in FIGS. 2 and 3 taken substantially in the plane of lines 4—4 of FIG. 3, with the workpiece clamp added and shown in elevation;

FIGS. 10 and 11 are plan and side views, respectively, of a further example of a typical workpiece;

FIG. 12 is a cam laid out for the exemplary workpiece of FIGS. 10 and 11;

FIG. 13 is a plan view of a modified form of workholding and positioning device embodying the invention;

FIG. 14 is a vertical section of the device shown in FIG. 13 taken substantially in the plane of lines 14—14 of FIG. 13; and FIG. 15 is a view from the right side of FIG. 13 of the device shown therein.

Figure 5:
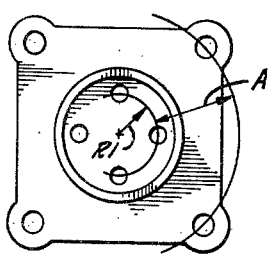
FIG. 5 is a plan view of the typical workpiece shown on the device of FIGS. 1–4.

While the invention is susceptible of various modifications and alternative constructions, illustrative forms of the invention have been shown in the drawings and will be described hereafter in considerable detail. It should be understood, however, that there is no intention to limit the invention to the forms disclosed; on the contrary, the intention is to cover all modifications, alternative constructions and equivalents falling within the spirit and scope of the invention as expressed in the appended claims.

I. WORK-HOLDING DEVICE OF FIGS. 1–4

In FIGS. 1–4 of the drawings the invention is shown in a preferred form embodied in a work-holding and positioning device mounted on a drill press table and comprising a rotary table 10 to which a workpiece is rigidly secured as by a clamp 12. A typical workpiece is shown in FIG. 5. Such workpiece may, for example, be a cast mounting plate having a square base with an annular central hub or boss. As shown in FIG. 5, a total of eight holes are required to be drilled in the mounting plate, four at the corners of the base and four within the central boss.

According to the present invention, the work-holding and positioning device mounted on the drill press table serves the function of a fixture for holding the workpiece during the operations involved in drilling such holes. In addition, the device also serves the function of a jig for fixing the relative location of work and cutting tool and for guiding the tool into engagement with the work to accurately locate and drill the series of holes required in the workpiece.

*a. Frame, Saddle and Table*

In carrying out this invention the rotary table 10 is supported on a saddle 14 which is translatable on a frame comprising end pieces 16, 18 connected by a pair of rods 20, 22. The saddle is slidably carried on the rods 20, 22 and is yieldingly urged in an endwise direction, toward the right in FIG. 3. To support the device with the work in machining position the frame is adapted to be rigidly fixed to the machine tool such as to the table of the drill press shown in FIG. 1, by clamps 26. The drill press spindle is equipped with the usual chuck to support a cutting tool. Such a cutting tool, for example, a drill 28, is movable downward into engagement with the workpiece to drill holes therein by moving the spindle in the usual way by a rack and pinion drive operated from the drill press handle. In this device, the rotary table provides means for positioning the workpiece angularly so as to move a point to be drilled on the workpiece into the vertical plane parallel to the axis of translation of the saddle and including the drill; the translatable saddle provides means for positioning the workpiece along the axis of movement of the saddle to locate the point to be drilled directly in line with the drill. Moreover, in keeping with the invention the saddle is caused to translate incident to table indexing, by pattern controlled means.

b. Pattern Control

Figure 6:
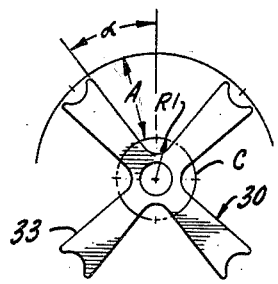
FIG. 6 is a plan view of a 1:1 ratio cam for the workpiece of FIG. 5.

To this end, fixed under the table 10 for movement in unison therewith as it is manually indexed, is a pattern herein shown as a cam 30 (FIG. 2) which cooperates with a roll follower 32 fixed to the frame to shift the saddle 14 and thereby the rotary table 10 to successive positions along the saddle axis of translation as the table is indexed. A cam 30 for the typical workpiece of FIG. 5, is shown in FIG. 6. This cam has a plurality of lobes 33 each with a notch into which the roll follower will fall as the cam is indexed to define a station. The bottom of the valley between each lobe 33 also defines a station making a total of eight stations defining the angular positions of the cam to locate the work piece for the required eight drilled holes. It will be readily understood that the drill 28 is movable by the operator into cutting engagement with the workpiece as the latter is held steady at each drilling station or position.

To guide and support the drill while it is moved into cutting engagement, a hardened guide bushing 34 is mounted over the table by a jig bracket 36. The hardened bushing 34 is located, in the present case, in line with the axis of translation described by the rotational center of the table 10. Similarly, the roll follower 32 is in line with this axis of translation. With this arrangement it is a relatively easy matter to lay out the cam or pattern for a series of holes in a workpiece since the cam is geometrically similar to and merely an analog of the workpiece. On the other hand, the position of the cutting tool guide may be changed, if desired, or the position of the pattern follower which will be reflected in the pattern or cam configuration. It will be understood, however, that the configuration of the cam or pattern is such that by rotating the cam as an incident to the indexing of the table, force is developed by the cooperation between the irregular working surface of the cam 30 and roll follower 32 causing the saddle and table carried thereby to shift toward and away from the roll follower in the direction of the axis of translation of the table.

Yielding means are provided for holding the cam 30 against the roll follower 32. This means in the present case comprises a plunger 38 (FIG. 3) acted against by air or other fluid under pressure. In the present case such plunger 38 is mounted within one of the rods 22 supporting the saddle 14 for translation which is tubular to receive such plunger. The plunger 38 is fixed to the saddle 14 as by means of a pin 40 (FIG. 4) which passes through a slot 42 in the lower side wall of the tubular rod 22. Air or fluid is admitted through an inlet fitting 44 to a chamber 46 at the left end of the tubular saddle supporting rod 22 and acts against the end of the plunger 38 to urge the saddle 14 to the right in FIG. 3 and thus in the desired direction. An O ring 48 in the plunger end seals against escape of fluid.

Turning now to FIG. 4 for further details of the device, the rotary table 10 is supported by a thrust bearing provided by balls 50 within a race between the underside of the rotary table annular flange 52 and the upper surface of a boss 54 on the saddle 14. The table has a downwardly extending outer rim 56 formed with an uneven inside surface so that to provide a hand wheel by which the table may be indexed manually. The table 10 has a dropped center providing a deep recess to accommodate hubs or projections of irregularly shaped workpieces. The indexing cam 30 is fixed to the underside of the central portion of the table by means herein shown as a machine screw 58 threaded into a tapped hole in the table. A collar 60 between the center portion of the table and the indexing cam serves as a spacer and retainer.

c. Work Clamp

A mounting plate 62 fashioned to receive the particular workpiece on which a machining operation is to be carried out is fixed to the top surface of the table 10. In the present case the mounting plate 62 has a flat upper surface to receive the flat base of a typical workpiece as shown in FIG. 5. Holes are drilled in the surface of the mounting plate at the locations of holes to be drilled in the workpiece so that the drill may be fed completely through the piece. Locating means such as pins, stops or blocks are fixed on the mounting plate and so arranged that the workpiece may be inserted on the plate in only the correct way for the drilling operation so that all duplicate workpieces are supported in the same position on the mounting plate.

Figure 1:
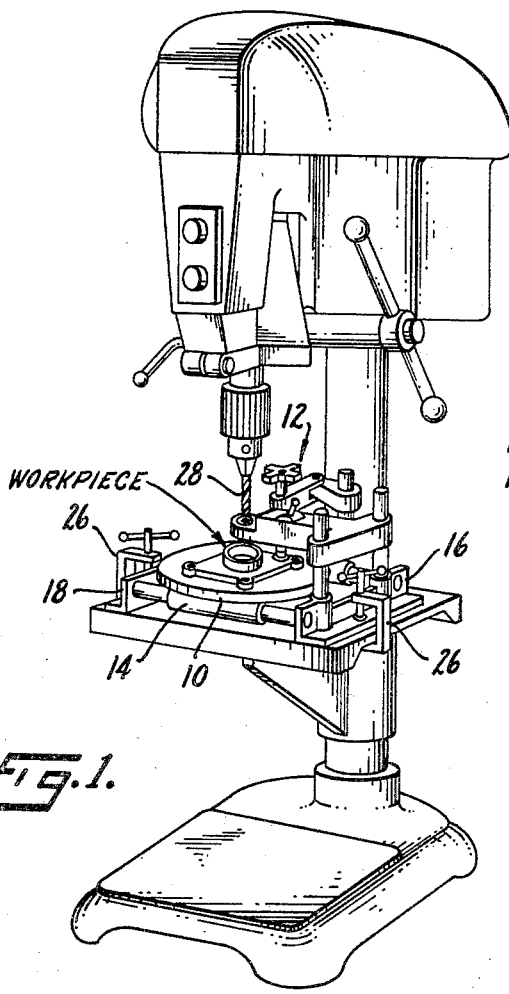
FIGURE 1 is a perspective view of a drill press with a work-holding and positioning device embodying the present invention mounted on the drill press table.

Cooperating with the mounting plate for holding the workpice rigidly and securely on the surface of the table, is the hand-operated clamp 12 shown in FIGS. 1, 2 and 4. This clamp means is exemplary only and comprises in this case a threaded clamping member 64 which may be operated by a handle 66 to move the lower end of the clamping member into engagement with the workpiece. The clamping member 64 is supported by a toggle bracket 70 on a post 72 fixed to the saddle 14 so that the clamp assembly moves bodily with the saddle 14. Because of the toggle bracket, it will readily be understood, the table 10 is free to rotate without interference from the clamp assembly even with the clamp member 64 contacting a workpiece at a point spaced from the center of the table. An important feature of this invention is that the work-holding and positioning device is suitable for limited quantity production and manufacture. A device intended for such use must provide means for changing workpieces with convenience and speed. The hand-operated clamp shown in FIGS. 1, 2 and 4 is quickly released and applied for removal and change of a workpiece on the table, although it will be understood that other quick-acting clamps such as an air-operated clamp as shown in FIG. 15 may be used instead of the hand-operated clamping means of FIGS. 2–4.

It will be further understood that one of the important aspects of this invention is that the work-holding and positioning device readily accommodates workpieces of different shapes and conditions. Thus the rotary table 10 which is provided with a flat mounting plate 64 in FIGS. 2–4, may be provided with mounting plates of other configurations so as to receive, for example, workpieces with elongated hubs or projections which may extend within the deep center portion of the table. A workpiece of this character is shown in FIGS. 10 and 11, and for mounting such a workpiece a mounting plate is provided having a central opening through which the stem extends to depend into the table center. Locating means will also be provided on the mounting plate surface to define the position for the work.

d. Drill Guide

Referring particularly to FIGS. 2 and 3, the details of the means for guiding the cutting tool into work engagement will be described in reference to these figures. As shown, a drill 28 is guided into cutting engagement with the workpiece by means of a drill guide bushing 34 carried by a bracket 36 over the worktable. This bracket 36 is T-shaped and clamped to a pair of vertical posts 74, 76 supported by the device frame. The bracket end is split with the separate pieces spanning the posts 74, 76 and held together in clamping engagement with the posts by a machine screw 78. The bracket 36 may be adjusted to any desired height by loosening the set screw 78 and sliding the bracket vertically on the posts 74, 76. With this arrangement the drill guide bushing 34 may be adjusted to a position closely spaced above the workpiece to steady the drill moving into cutting engagement. Vertical adjustment allows for a wide variety of workpiece shapes yet affords the advantage of rigid cutting tool support during drilling operations.

A simple and convenient arrangement for replacing the drill bushing 34 is provided by mounting the bushing in a member 80 removable from the bracket. The member 80 may be slid into a recess in the end of the bracket. A quick release jam type latch 82 is incorporated to hold the drill bushing support member 80 in the bracket comprising a ball 84 having a flat surface 86 on the lower edge and floating in a socket 88 in the bracket. A flat 90 is provided on the top of the support member. Still referring to FIG. 2, the flat side 86 of the ball 84, when the latter is tilted counterclockwise by means of a finger piece 92 or by the end of the member 92 as it is pushed into the recess, provides clearance for the bushing support 80. But when the edge of the ball 84 is returned by the spring 94 into engagement with the flat on the drill bushing support, the latter will be jammed in place so that it cannot be pulled out from the recess. The member 92 is released simply by tilting the ball 84 by means of the finger piece 92.

II. CAM LAYOUT (FIGS. 5–12)

With a workpiece like that illustrated in FIG. 5 secured on the rotary table, and with air or other fluid admitted to the plunger chamber 46 to continuously and yieldingly urge the saddle 14 in a direction to maintain the cam 30 fixed to the rotary table 10 in engagement with the roll follower 32, the workpiece on the table will be located for successive drilling operations by indexing the table to successive angular positions as determined by the shape of the cam. It will be understood that as an incident to indexing between angular drilling positions, the saddle and table carried thereby is translated to shift the workpiece to successive positions of translation. A cam 30 suitable for the purpose of shifting the worktable in this manner for the workpiece of FIG. 5 is laid out in FIG. 6. The details of the roll follower 32 and its means of support, which roll follower cooperates with such cam, is shown in FIG. 2. Referring to the latter figure, the roll follower is supported on an arm 96 adjustably fastened to the underside of one end piece 16 of the device frame. The roller supporting arm has an elongated slot 98 so that it is movable to various positions of adjustment and may be fixed in any of such positions by means of a set screw 100 received in a tapped hole in the frame end piece 16. As shown in FIG. 2, the arm 96 is positioned so that the roll 32 is in vertical alignment with the drill guide bushing 34 carried over the worktable. With the roll follower 32 so positioned, a suitable cam for the workpiece of FIG. 5 is laid out as shown in FIG. 6 using a 1:1 ratio between the dimensions of the cam and the dimensions of the workpiece.

In laying out such a cam, a circular base line C is struck having the same radius R1 as the inner ring of holes in the workpiece. Four equally spaced points are located around the circular base line. A circle concentric with the base line circle is struck from the same center having a radius equal to the sum of the radius R1 plus the distance A in FIG. 5 between the inner and outer ring of holes to be made in the mounting plate casting. Four equally spaced points are then laid out along the outer circle of the cam layout, as shown in FIG. 6. Arcs with a radius equal to the roll follower radius are then struck from each of the four points on the circular base line. Similar arcs are struck from each of the four points on the outer circle concentric with the base line defining the notches in each cam lobe 33. The inner and outer sets of arcs are connected, as shown in FIG. 6, to form a smoothly curved cam working surface between the notches in each lobe 33 and the deep valleys between each such lobe. With a cam so constructed mounted on the work-holding and positioning device shown in FIGS. 2–4, the saddle will be caused to translate as an incident to table indexing between successive angular positions of approximately 45° between the low and high points of the cam working surface. With hydraulic means to hold the cam in engagement with the roll follower, the saddle and table will be held against displacement from each of the drilling positions due to the shape of the cam.

Figure 7:
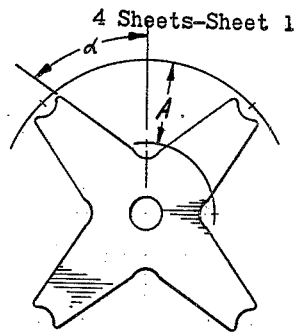
FIG. 7 is a plan view of a preferred cam for the workpiece of FIG. 5.

While a cam of the configuration shown in FIG. 6 may be used with the device of this invention, it has been found that a preferred cam having a larger pressure angle than the angle $\alpha$ in FIG. 5 facilitates manual positioning of the worktable. With decreasing pressure angles it becomes more difficult to index the table, until at some critical angle which, it has been found, is approximately 15°, the cam and cam follower will be locked against motion. This locking angle is a function of the bearing force against the cam and the slope of the working surface along the drop off on the side of each cam lobe 33. It has been found, therefore, that it is preferred to have pressure angles substantially greater than 15°. A cam laid out with this consideration in mind is shown in FIG. 7. The critical dimension on such cam is the distance A between the circular base line and the outer circle concentric therewith. This dimension A is fixed by the workpiece dimensions, being the distance between the inner and outer ring of holes to be drilled in the exemplary workpiece of FIG. 5. Thus with the cam for this workpiece the pressure angle may be increased by using a larger diameter circular base line. Such a cam no longer has the 1:1 ratio of the cam shown in FIG. 6. In other respects the cam is laid out similarly, following the geometry of the workpiece.

While the workpiece shown in FIG. 5 has sets of holes to be drilled equally spaced around concentric circles, cam layout for a workpiece having irregularly spaced holes also is a relatively simple matter. Referring, for a further example of cam layout, to FIGS. 10–12, the workpiece of FIGS. 10 and 11 has three irregularly spaced holes to be drilled. The radius R2 for the cam circular base line C2 for such a workpiece is obtained following usual geometry procedures by drawing a line through the centers for two of the holes, bisecting this line and erecting a first perpendicular, drawing a second line through the centers for the third hole and one of the others, and bisecting this second line and erecting a second perpendicular; the center for the circular base line will be found at the intersection of the first and second perpendiculars. The points marking the centers for the holes to be drilled are then laid out along the circular base line according to the spacing for such holes established by the workpiece dimensions, arcs struck to provide the working surface notches, and then the arcs connected to form a smoothly curved surface.

a. Master Cam

Figure 8:
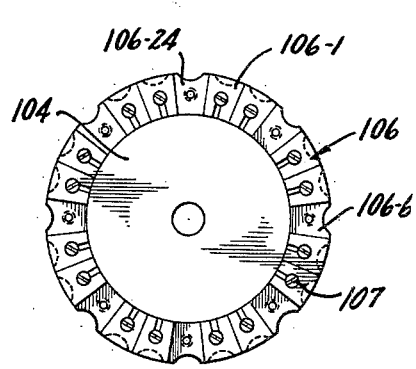
FIG. 8 is a plan view of a master cam for use with a work-holding and positioning device embodying the invention.
Figure 9:
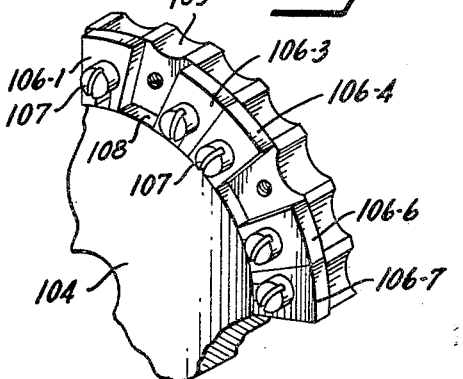
FIG. 9 is a perspective view of details of the master cam segments and mounting arrangement therefor.

A further feature of the invention is the provision of a master cam for use on a work-holding and positioning device as shown in the drawings. Such a master cam is particularly suitable for use with a workpiece like that illustrated in FIGS. 10 and 11 which has a series of holes spaced around a circle. This master cam eliminates the necessity to make special cams for jobs where the holes happen to be located in a manner suited to its use. Referring to FIGS. 8 and 9 for details of this aspect of the invention, the master cam includes a circular base plate 104 carrying a ring of segments 106—1 to 106—24 adjacent the plate periphery. A total of twenty-four segments are shown on the cam of FIG. 8. Such segments are fastened in place by means such as machine screws 107 and to receive the segments, the peripheral edge of the base plate is machined away as shown in FIG. 9 to provide a recess for each segment and a shoulder 108 against which the curved inner edge of each segment abuts when in place locking the segment against movement. The outer edge of the master cam base plate is scalloped with notches 109 conforming to the roller diameter, within a notch opposite each segment. With all segments in place the outer edges of the segments form a continuous circle. By removing selected segments a cam working surface is provided with notches defining the cam stations. To provide a cam for the workpiece shown in FIGS. 10 and 11, for example, segments numbered six, eighteen and twenty-three will be removed to provide notches spaced at 90°, 270° and 345°, around the cam periphery, which corresponds to the angular spacing of the holes to be drilled in the workpiece shown in such figures. It will be readily understood that this master cam thus provides a means for conveniently and readily forming a cam suitable for workpieces of this type.

III. WORK-HOLDING DEVICE OF FIGS. 13–15 a. Frame, Saddle and Table

A modified form of the work-holding and positioning device, shown on the drill press table of FIG. 1, is shown in FIGS. 13–15. In this case the workpiece is clamped to a rotary worktable 110 which is mounted in a swinging arrangement on a pedestal column 112. For this purpose the rotary worktable is supported in offset relation from the pedestal column by means of an arm 114 swiveled on the column. The supporting pedestal has a crescent-shaped base 116 providing steady support for the table and may be readily clamped to the base or table of a drilling machine or like machine tool. The end of the swiveling arm forms a housing 118 for the rotary worktable which is supported thereon by a thrust bearing formed by a ring of balls 120 received in a race defined by grooves in the underside of the table and the flat upper edge of the housing respectively. A workpiece mounting plate 122 is fixed by any suitable means to the upper surface of the table and is provided with means for locating a workpiece in proper position for the drilling operation. It will be readily understood that the mounting plate will be shaped to suit the particular workpiece involved, and in this case is provided with a large central opening to allow a hub or projection on the workpiece to extend into the well in the center of the table as well as locating blocks or stops on its surface. A collar 124 fixed to the underside of the dropped center of the table serves as a retainer and spacer.

b. Pattern Control

Fastened to the underside of the rotary worktable for movement in unison therewith is a pattern herein shown as a cam 126 which cooperates with means for tracing the pattern and converting the same into workpiece locating motion, herein shown as a roll follower 128 engaging the cam edge. The roll follower 128 is carried, as shown in FIG. 15, by a lug 130 extending from the inner edge of one end of the crescent-shaped base of the pedestal. Provision for adjustment of the location of the roll follower 128 is provided, in this case shown as a series of spaced holes 132 in the roll follower supporting lug 130. With such a provision for roll follower adjustment either a 1:1 ratio cam or a cam having a preferred configuration as shown in FIG. 7 may be used for workpiece positioning purposes. The arm 114 carrying the worktable is swiveled on the upright pedestal column thereby allowing the rotary table to swing along a curved path toward and away from the roll follower. The center of the rotary worktable thus describes a curved axis of translation as the rotary worktable is caused to translate upon indexing of the table by cooperation between cam and follower.

To yieldingly urge the worktable toward the roll follower so that the cam is maintained in engagement therewith, a simple spring-biasing means is included. In the present case the spring-biasing means comprises a torsion bar 134 suspended in the hollow center of the pedestal column 112. The upper end of the torsion bar, as shown in FIG. 14, is held against movement while the lower end of the bar is fixed to the table carrying arm by means herein shown as a pin 136. With this arrangement, by winding up the torsion bar 134 in a direction tending to cause the supporting arm and table to swivel toward the roll follower (counterclockwise in FIG. 13) a spring tension force is applied to yieldingly hold the cam and roll follower in engagement causing the roll to follow the periphery of the cam when the latter is indexed. By rotating the table the supporting arm and table carried thereby will be caused to translate away from and toward the roll according to the configuration of the cam and as the cam is rotated incident to table indexing.

Simple and readily operated means for adjusting the spring force yieldingly acting to maintain the cam and roll follower in engagement is provided in this case by means attached to the upper end of the bar to adjust the amount of windup of the torsion bar. The bar 134 has a cylindrical shank portion near each end and is slidable and rotatable within the bore in the pedestal column 112. The spring tension adjustment means comprises a pair of nuts 138, 140 received by threads of the same hand but of different pitch on the top of the pedestal column. The upper tip of the torsion bar 134 is square in shape and this tip portion is received in a square opening 141 in the top nut 138 so that the torsion bar will be wound up by turning this nut. The thread hand is such that after the top nut 138 and bar 134 are wound up and then released, this nut will be run down on the column threads to engagement with the lower second nut 140. Because of the difference in pitch of the threads, with the top nut having a coarse thread and the second lower nut 140 having a fine thread, these nuts cannot turn together and will lock up to hold the tension in the torsion bar according to the position of the lower nut on the column.

c. Drill Guide

Another feature of this modified form of the invention is the provision of a bracket supported drill guide bushing 142 over the rotary worktable for guiding a drill or similar cutting tool into cutting engagement with a workpiece on the table. In the present case the bracket supporting the drill guide bushing includes an arm 143 pivotally carried on a base 144 clamped rigidly to the pedestal column. The base 144 in the present case supports both a clamp 145 for the workpiece and the arm 143, and is adjustable vertically on the column after loosening the clamping screw. The drill guide bushing supporting arm 143 may be swung to an out-of-the-way position and is held with the drill bushing 142 over the table by means of a pivotally supported latch 146. A spring 147 fixed to the bracket base 144 and bearing against the back of the latch 146 urges the same so that the projecting end of the latch 146 engages and holds the bracket arm against movement. The latch may be pivoted counterclockwise in FIG. 13 to release the arm 143 allowing the latter to be swung laterally away from a position over the table. In this manner the workpiece holding and positioning device may be set up for operations wherein no guide is required for the cutting tool. For convenience in changing bushings for accommodating drills of different diameter, the drill guide bushing 142 is held by a member 147 removably received in a recess in the end of the supporting arm 143 by a latch mechanism similar to the mechanism 82 previously described in connection with FIGS. 2–4.

d. Work Clamp

A suitable quick-acting clamp 148 for holding a workpiece on the rotary table is also shown in FIG. 14. As mentioned above this clamp is carried by the same bracket supporting the drill guide bushing on the pedestal column 112 which is adjustable to different heights according to the shape of the workpiece. The clamp 145 includes a linkage 150 pivotally supported on the bracket base 144 and carrying a piston-operated vertically movable clamping element 151 the lower end of which engages the workpiece. An air cylinder formed in a vertical bore in the end of the clamp arm receives a piston 152 fixed to the work-engaging element. A compression spring 154 normally raises the plunger 152 against the upper end of the cylinder. The plunger is movable downward in the cylinder by air under pressure admitted through an inlet fitting 155. An O ring 156 around the piston 152 seals against escape of fluid from the cylinder. The vertically movable and slidably received work-engaging element is fixed to the plunger and movable therewith. Conventional control instrumentalities will be provided for controlling admission of air or other fluid to the hydraulic clamp cylinder as will be readily understood.

While a hydraulic clamp is shown included in the device of FIGS. 13–15 it will be understood that a hand-operating clamp such as shown in FIG. 2 or any equivalent clamping means may be provided as desired.

I claim:

1. For use on a machine tool having a rotatable spindle adapted to support a cutting tool, a workpiece holding and positioning device comprising a rotary table for supporting a workpiece, a saddle carrying said rotary table, means supporting said saddle for translation in a plane normal to the axis of rotation of said table, said supporting means being adapted to be mounted on said machine tool with said spindle in line with the axis of translation of the rotational center of said table, and means including a cam having a plurality of notches in its periphery each defining an angular machining position, means connecting said cam for rotation in unison with said table and cooperating with a follower to shift said saddle to successive positions of translation incident to table indexing to successive angular machining positions.

2. For use on a machine having a rotatable spindle, a device for holding and positioning a workpiece comprising a rotary table for supporting a workpiece, a saddle carrying said table, means supporting said saddle for translation in a plane normal to the axis of rotation of said table, said device being adapted to be mounted on said machine tool with said spindle over said table, and cam means for locating said saddle at succesive positions of translation incident to table indexing including a cam rotatable and translatable in unison with said table, a follower fixed to said saddle supporting means and means for adjusting said follower to different fixed positions along an axis substantially parallel to the axis of translation of said saddle.

3. For use on a drilling machine having a rotatable spindle adapted to support a cutting tool, a device for holding and positioning a workpiece for multiple hole drilling comprising a rotary table for supporting a workpiece, a saddle carrying said rotary table, a frame supporting said saddle for translation along an axis in a plane normal to the axis of rotation of said worktable, and cam means for locating said saddle at successive positions of translation incident to table indexing including a cam rotatable and translatable in unison with said table, a follower fixed to said frame, and means urging said saddle to maintain said cam in yielding engagement with said follower.

4. For use on a drilling machine having a rotatable spindle adapted to support a cutting tool, a device for holding and positioning a workpiece for multiple hole drilling comprising a rotary table for supporting a workpiece, a saddle carrying said rotary table, a frame supporting said saddle for translation along a straight axis in a plane normal to the axis of rotation of said worktable, said frame including a pair of parallel rods with said saddle slidably mounted on said rods, and cam means for locating said saddle at successive positions of translation incident to table indexing including a cam rotatable and translatable in unison with said table, a follower fixed to said frame adjacent one end of said rods, and means urging said saddle longitudinally of said rods to maintain said cam in yielding engagement with said follower.

5. For use on a drilling machine having a rotatable spindle adapted to support a cutting tool, a device for holding and positioning a workpiece for multiple hole drilling comprising a rotary table for supporting a workpiece, a saddle carrying said rotary table, a frame supporting said saddle for translation along a curved axis in a plane normal to the axis of rotation of said worktable, said frame including a column with said saddle swiveled on said column, and cam means for locating said saddle at successive positions of translation incident to table indexing including a cam rotatable and translatable in unison with said table, a follower fixed to said frame adjacent the base of said column, and resilient means tending to swivel said saddle to maintain said cam in yielding engagement with said follower.

6. For use on a drilling machine having a spindle, a device for holding and positioning a workpiece for multiple hole drilling, comprising a rotary table for supporting a workpiece, means for clamping a workpiece on said table, a saddle carrying said table, means supporting said saddle for translation in a plane normal to the axis of rotation of said table, said device being adapted to be mounted on said machine tool, a tool guide carried by said frame in alignment with the axis of translation of the rotational center of said table, and cam means for locating said saddle at successive positions of translation incident to table indexing including a cam rotatable and translatable in unison with said table, a follower aligned with the axis of translation of the rotational center of said table, and means urging said saddle to maintain said cam in yielding engagement with said follower.

7. A master cam comprising, in combination, a circular base plate with a plurality of concave notches in the edge of said plate, and a ring of segments removably fixed adjacent the edge of said plate axially spaced from and aligned with said notches, respectively, each segment having an arcuate convex outer edge with the same curvature as and registering with the circular envelope defined by the edge of said circular base plate, and means for mounting each segment on the edge of said plate so as to bridge the aligned notch, so that the edges of adjacent ones of said segments provide a substantially circular camming surface and with selected ones of said segments removed said master cam provides a notched circular cam working surface.

8. For use on a drilling machine having a rotatable spindle adapted to support a cutting tool, a device for holding and positioning a workpiece for multiple hole drilling comprising a rotary table for supporting a workpiece, a saddle carrying said rotary table, a frame supporting said saddle for translation along a straight axis in a plane normal to the axis of rotation of said worktable, said frame including a pair of parallel rods with said saddle slidably mounted on said rods, one of said rods having a tubular portion forming a cylinder adapted to receive fluid under pressure from a source thereof, and cam means for locating said saddle at successive positions of translation incident to table indexing including a cam rotatable and translatable in unison with said table, a follower fixed to said frame adjacent one end of said rods, and means urging said saddle longitudinally of said rods to maintain said cam in yielding engagement with said follower including means fixed to said saddle defining a plunger slidably received in said cylinder.

9. For use on a drilling machine having a rotatable spindle adapted to support a cutting tool, a device for holding and positioning a workpiece for multiple hole drilling comprising a rotary table for supporting a workpiece, a saddle carrying said rotary table, a frame supporting said saddle for translation along a curved axis in a plane normal to the axis of rotation of said worktable, said frame including an upright tubular column, means mounting said saddle to swivel on said column, and cam means for locating said saddle at successive positions of translation incident to table indexing including a cam rotatable and translatable in unison with said table, a follower fixed to said frame adjacent the base of said column, and resilient means including a torsion bar supported in the tubular column and fixed thereto and to said saddle tending to swivel said saddle to maintain said cam in yielding engagement with said follower.

10. For use on a drilling machine having a rotatable spindle mounted for longitudinal movement and adapted to support a cutting tool, a device for holding and positioning a workpiece for multiple hole drilling comprising a rotary table for supporting a workpiece, a saddle carrying said rotary table, a frame supporting said saddle for translation along an axis in a plane normal to the axis of rotation of said worktable, a drill guide carried by said frame over said table in alignment with said spindle for receiving and guiding said cutting tool into cutting engagement with a workpiece supported on said table upon longitudinal movement of said spindle, and cam means for locating said saddle at successive positions of translation incident to table indexing including a cam rotatable and translatable in unison with said table, a follower fixed to said frame, and means urging said saddle to maintain said cam in yielding engagement with said follower.

References Cited in the file of this patent

UNITED STATES PATENTS

| | | |
|---|---|---|
| 2,484,758 | Sonnie | Oct. 11, 1949 |
| 2,679,787 | Froehlich | June 1, 1954 |
| 2,874,599 | Charlat | Feb. 24, 1959 |